United States Patent
Park

(10) Patent No.: US 8,473,573 B2
(45) Date of Patent: Jun. 25, 2013

(54) METHOD FOR PROVIDING CONTENTS TO CLIENT AND SERVER USING THE SAME

(75) Inventor: Jun-Sik Park, Seoul (KR)

(73) Assignee: CDNetworks Co., Ltd., Seoul (KR)

( * ) Notice: Subject to any disclaimer, the term of this patent is extended or adjusted under 35 U.S.C. 154(b) by 597 days.

(21) Appl. No.: 12/673,079

(22) PCT Filed: Aug. 12, 2008

(86) PCT No.: PCT/KR2008/004682
§ 371 (c)(1),
(2), (4) Date: Feb. 11, 2010

(87) PCT Pub. No.: WO2009/022844
PCT Pub. Date: Feb. 19, 2009

(65) Prior Publication Data
US 2011/0185034 A1   Jul. 28, 2011

(30) Foreign Application Priority Data
Aug. 14, 2007   (KR) .................... 10-2007-0082017

(51) Int. Cl.
*G06F 15/16*   (2006.01)
(52) U.S. Cl.
USPC .......... 709/217; 709/203; 709/219; 709/223; 725/86
(58) Field of Classification Search
USPC .... 709/203, 217, 223, 208, 231, 219; 725/86, 725/88
See application file for complete search history.

(56) References Cited

U.S. PATENT DOCUMENTS

| | | | |
|---|---|---|---|
| 5,809,244 A * | 9/1998 | Asai et al. ..................... | 709/217 |
| 6,816,895 B2 | 11/2004 | Andreakis et al. | |
| 7,526,520 B2 * | 4/2009 | Laux et al. .................... | 709/203 |
| 7,657,638 B2 * | 2/2010 | Deen et al. .................... | 709/229 |
| 7,822,866 B2 * | 10/2010 | Doumuki ...................... | 709/231 |
| 8,234,679 B2 * | 7/2012 | Lawrence-Apfelbaum .... | 725/86 |
| 2002/0095459 A1 * | 7/2002 | Laux et al. .................... | 709/203 |
| 2002/0112244 A1 * | 8/2002 | Liou et al. ....................... | 725/93 |
| 2004/0068755 A1 * | 4/2004 | Davies et al. ................. | 725/133 |
| 2006/0179078 A1 * | 8/2006 | McLean .................... | 707/104.1 |
| 2008/0008448 A1 * | 1/2008 | Kang et al. ..................... | 386/95 |
| 2008/0034029 A1 * | 2/2008 | Fang et al. ..................... | 709/203 |
| 2008/0235739 A1 * | 9/2008 | Coebergh Van Den Braak ............... | 725/86 |
| 2010/0223357 A1 * | 9/2010 | Einarsson et al. ............ | 709/219 |
| 2011/0060994 A1 * | 3/2011 | Maxwell et al. .............. | 715/700 |

FOREIGN PATENT DOCUMENTS

| JP | 10-240507 A | 9/1998 |
|---|---|---|
| KR | 2000-0060715 A | 10/2000 |
| KR | 2003-0070238 A | 8/2003 |

OTHER PUBLICATIONS

PCT International Search Report and Written Opinion, PCT/KR2008/004682, Feb. 27, 2009, 12 Pages.

* cited by examiner

*Primary Examiner* — Ramy M Osman
(74) *Attorney, Agent, or Firm* — Fenwick & West LLP

(57) ABSTRACT

A method for providing one or more contents to a client is disclosed. The method comprise receiving a request for one or more specific contents from the client; transmitting, to the client, a contents reproducer, which allows a user of the client to define at least one new command and to define an external appearance of the contents reproducer, wherein the external appearance includes an object to be represented as the new command; and transmitting, to the client, the requested contents thereby to be reproduced using the contents reproducer.

18 Claims, 6 Drawing Sheets

(a)

(b)

METHOD FOR PROVIDING CONTENTS TO CLIENT AND SERVER USING THE SAME

TECHNICAL FIELD

The present invention relates to a method for providing digital media contents, and more particularly, to a method for providing digital media contents and a contents reproducer, which allows a user to customize the contents reproducer, for enabling a user to reproduce the digital media contents using the contents reproducer.

BACKGROUND ART

Currently, a user requires various digital media contents. The digital media contents are delivered the user from a contents provider of various contents.

The digital media contents are used by the user for various purposes, for example, educational purposes, entertaining purposes, etc.

For the educational purposes, the contents provider can work out a service strategy for providing a contents reproducer (or a program for enabling to reproduce the content) (ex., a so-called movie player) by which one or more educational contents can be reproduced in a distinctive manner as well as for providing the educational content.

However, since most of the contents providers don't have plenty of time and money to directly produce a unique contents reproducer (ex., movie player), they use a conventional contents reproducer (ex., movie player).

Thus, there is a drawback that the contents provider provides only one or more high quality contents without providing a unique contents reproducer. And, the drawback also exists in a web-based VOD (Video on Demand), a VoIP (Voice on Internet Protocol) and other streaming services.

In some cases, the user can modify an external appearance of the contents reproducer such as movie player by himself/herself. Even though the external appearance of the contents reproducer can be modified by the user, it is possible to modify only a position or a shape of the external appearance.

Accordingly, imperfection of customization of the contents reproducer causes the user not to be satisfied.

DISCLOSURE OF INVENTION

Technical Problem

Therefore, it is an object of the present invention to solve the abovementioned problem. That is, the present invention is to completely customize a means for reproducing a content.

Other objects of the present invention will be defined through preferred embodiments explained hereafter.

Technical Solution

To achieve those objects, the present invention allows a user to selectively define a new command for controlling a reproduction of contents or for a new operation. And, to achieve those objects, the present invention allows the new command to be displayed on a contents reproducer (or a reproducing program) as a new object selectively defined by the user, which is an image and a text.

To achieve the those objects, there is provided a method for providing one or more contents to a client, comprising: receiving, from the client, a request for one or more contents; transmitting, to the client, a contents reproducer which allows a user of the client to define at least one new command and to define an external appearance of the contents reproducer to be displayed on the client, wherein the external appearance includes an object to be represented as the new command; and transmitting, to the client, the requested contents thereby to be reproduced using the contents reproducer.

The new command may be defined by using several commands which are prepared in the contents reproducer.

The contents reproducer may comprises a contents reproducing unit for reproducing the contents; and a customizing unit for allowing the user of the client to define the at least one new command and the external appearance.

Also, the transmitting step of the contents reproducer may comprise transmitting, to the client, the contents reproducing unit; and transmitting, to the client, the customizing unit.

To achieve the those objects, there is provided a method for providing one or more contents to a client, comprising: receiving, from the client, a request for a specific content; checking whether or not a contents reproducer which allows a user of the client to define at least one new command and to define an external appearance of the contents reproducer to be displayed on the client, wherein the external appearance includes an object to be represented as the new command is installed in the client; and transmitting, to the client, the requested contents thereby to be reproduced using the contents reproducer.

To achieve the those objects, there is provided a server for transmitting one or more contents to a client, comprising: a transceiver for receiving a request for one or more specific contents from the client, transmitting to the client a contents reproducer if the client doesn't have the contents reproducer, and transmitting to the client the requested contents; and a storage unit for storing the requested contents and the contents reproducer which allows a user of the client to define at least one new command and to define an external appearance of the contents reproducer to be displayed on the client, wherein the external appearance includes an object to be represented as the new command.

To achieve the those objects, there is provided a method for receiving one or more contents from a server, comprising: requesting, to the server, one or more specific contents; receiving, from the server, a contents reproducer, which includes several commands for controlling a reproduction of the contents and allows a user of the client to generate at least one new command by using the several commands, wherein the new command is selectively represented as at least one object generated or selected by the user within the contents reproducer; and reproducing the contents using the contents reproducer.

To achieve the those objects, there is provided a machine-readable program for reproducing one or more contents, the machine-readable program comprising steps of: displaying a screen for allowing a user to define at least one new command and to define an external appearance of the program to be displayed, wherein the external appearance includes an object to be represented as the new command; displaying the object as the at least one of the new command and the plurality of prepared commands; and reproducing the contents according to at least one of the new command, if the object is selected.

To achieve the those objects, there is also provided a method for customizing a contents reproducer comprises: defining at least one object to be displayed on an external appearance of the contents reproducer; defining at least one new command using prepared commands of the contents reproducer; and mapping the at least one object with at least one of the new command and the prepared commands.

MODE FOR THE INVENTION

Figure 1:
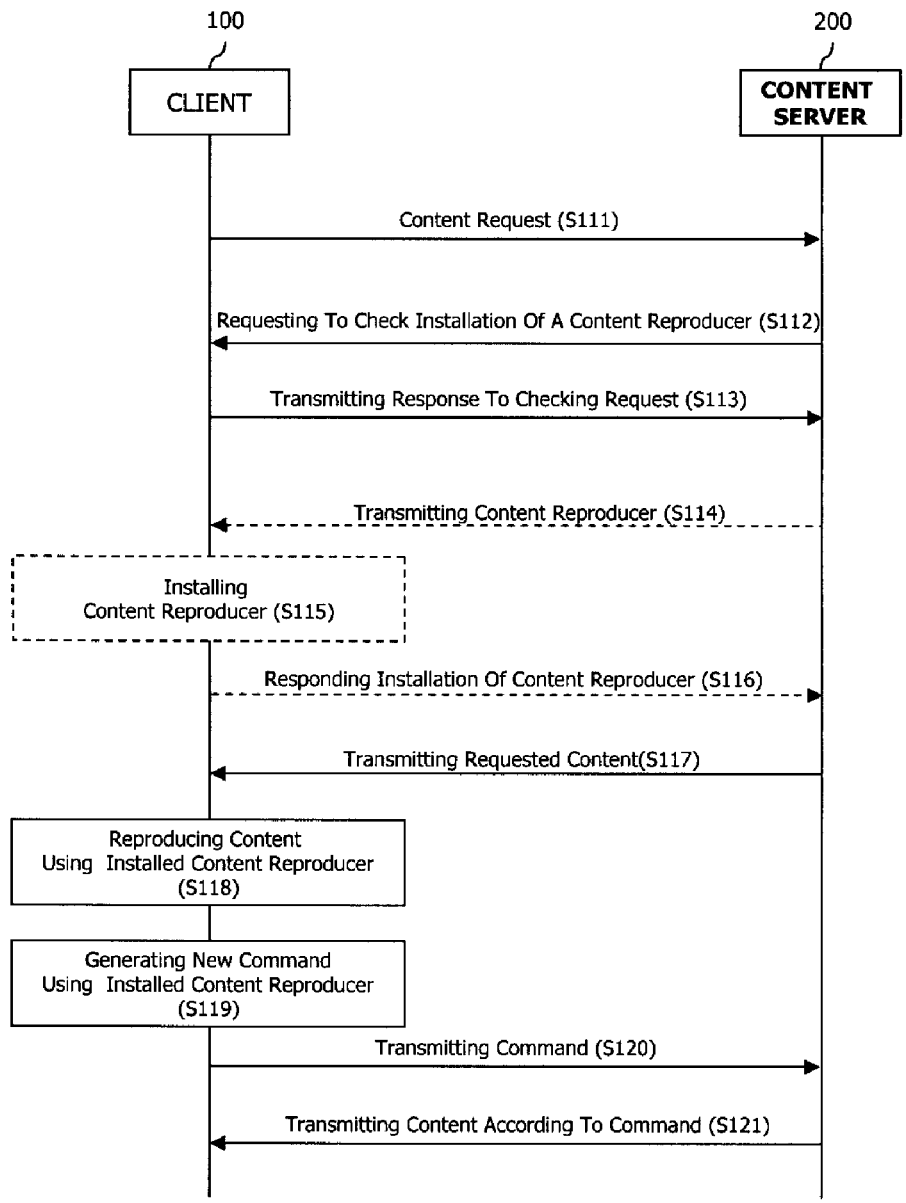
FIG. 1 is a flow chart illustrating a basic concept of the present invention.

Though the present invention may be variously modified and have several embodiments, specific embodiments will be shown in drawings and be explained in detail. However, the present invention may not be limited thereto, it is intended that the present invention cover modifications and variations of this invention provided they come within the scope of the appended claims and their equivalents.

Though terms including ordinal numbers such as a first, a second may be used to explain various components, the components are not limited to the terms. The terms are used only for the purposed of distinguishing one component from another component. For example, a first component may be named as a second component, or similarly, the second component may be named as the first component, without departing from the scope of the present invention. A term 'and/or' is used to include a combination of a plurality of disclosed items or one of the items.

In case that it is mentioned that a certain component is "connected" or "accessed" to another component, it may be understood that the certain component is directly connected or accessed to the another component or that a component is interposed between the components. In the meantime, in case that it is mentioned that a certain component is "directly connected" or "directly accessed" to another component, it may be understood that any component does not interposed therebetween.

Terms used in the present invention is to merely explain specific embodiments and don't intend to limit the present invention. A singular expression includes a plural expression except that two expressions are contextually different from each other. In the present invention, a term "include" or "have" is intended to indicate that characteristics, figures, steps, operations, components, elements disclosed on the specification or combinations thereof exist. Rather, the term "include" or "have" should be understood so as not to preexclude existence of one or more other characteristics, figures, steps, operations, components, elements or combinations thereof or additional possibility.

Except that they are not differently defined, all terms used in the present invention including technical or scientific terms have the same meanings with terms that are generally understood by those skilled in the art related to the field of the present invention. The terms same as those of which are defined in a general dictionary should be understood that the terms have meanings same as contextual meanings of the related art. And, as long as the terms are not definitely defined in the present invention, the terms are not interpreted as ideal or excessively formal meanings.

Hereafter, preferred embodiments in accordance with the present invention will be explained in detail with reference to accompanying drawings. Components same or corresponding to each other will have the same reference numeral and overlapped explanation regarding thereto will be omitted.

Referring to FIG. 1, a flow for providing one or more contents according to the present invention will be explained below.

According to the present specification, a server 200 provides a contents reproducer (or, contents reproducing program, contents player), which allows a user of a client 100 to customize the contents reproducer based on it's preferences, and the user may define or generate a new command for controlling a reproduction of a content, by using a plurality of prepared commands within the contents reproducer. Therefore, the user may enable the contents reproducer to reproduce the contents according to the new command. The contents reproducer according to the present specification, as described below, may comprises a contents reproducing unit for reproducing the contents and a customizing unit for allowing the user of the client to define the new command. Particular explains for the present invention follow.

The client 100 requests one or more specific contents from the contents server 200 (S111). The contents server 200 transmits a request message for checking whether the contents reproducer is already installed in the client 100 in response to the request of the contents (S112). Then, the client 100 checks it, and transmits a response message indicating whether or not the contents reproducer is already installed (S113).

The contents server 200 transmits the contents reproducer to the client 100, if it is determined that the client 100 doesn't install the contents reproducer (S114). It is noted that the contents reproducer is transmitted by another server such as a distribution server. Also, it is noted that the contents reproducer comprises the contents reproducing unit ant the customizing unit. Here, it is possible that the contents server 200 first transmits the contents reproducing unit and then transmits the customizing unit.

Having received the contents reproducer, the client 100 installs it (S115), and transmits a response message indicating whether or not the contents reproducer is successfully installed (S116).

Then, the contents server 200 transmits the requested contents to the client 100 (S117). The client 100 receives the contents and reproduces (or, play back) it using the contents reproducer (S118).

Meanwhile, the user of the client 100 may define or generate a new command by using a plurality of prepared commands (e.g., by combining the plurality of prepared commands) as will described below by referring FIGS. 2 to 5 (S118), and executes it. Also, the user of the client 100 may generate or select at least one object, which can be displayed for representing at least one of the new command and the plurality of prepared commands (e.g., button), among a plurality of prepared objects.

If the user wants to execute the new command, the client 100 executes the new command by executing corresponding commands among the plurality of prepared commands. At this time, if the corresponding commands are for controlling the reproduction of the content, the client 100 transmits the corresponding commands to the server (S120).

Then, the server 200 interprets the corresponding commands and controls the transmission of the contents (S121).

Figure 2:
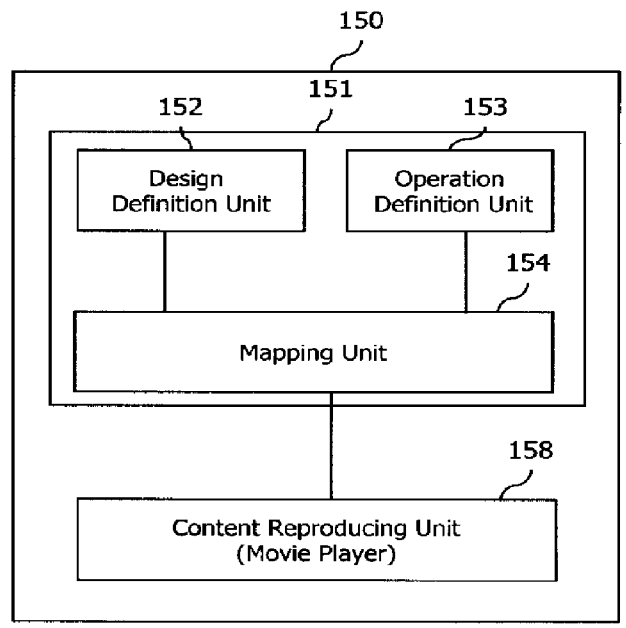
FIG. 2 is an exemplary view illustrating a logical configuration of contents reproducer in accordance with one embodiment of the present invention.

Referring to FIG. 2, a configuration of contents reproducer in accordance with one embodiment of the present invention will be explained below.

FIG. 2 is a diagram illustrating a configuration of contents reproducer 150 in accordance with the one embodiment of the present invention.

It is noted that the contents reproducer 150 is implemented as a program to be installed in a client such as a PC (Personal Computer), a notebook, a PDA (Personal Digital Assistant) or implemented as a client itself such as a PC (Personal Computer), a notebook, a PDA (Personal Digital Assistant) having a microprocessor which reproduces digital media contents and allows a user to define or generate a new command for controlling the reproduction.

Referring to FIG. 2, the contents reproducer 150 includes a customizing unit 151 and a contents reproducing unit 158. Here, the contents reproducing unit (or contents player) 158 may be implemented as a program module separated from the customizing unit 151 or as one module together with the customizing unit 151. Also, each of the units 152 and 153 may be each part of the microprocessor.

In FIG. 2, it is obvious that the contents reproducing unit 158 can reproduce various digital media contents. For example, the contents reproducing unit 158 can reproduce a voice, sound, video (audio/video), or various digital media contents.

Hereafter, it will be explained focusing on reproducing the video. However, it should not be interpreted that the present invention is limited as relating only video.

The contents reproducer 150 may be generally provided with an external appearance by which only commands including play, pause, stop, forward and rewind can be executed.

However, the commands for controlling the contents reproducer 150 may be different depending on a user's preference using the contents reproducer 150 or a characteristic of digital media contents.

That is, in case that a contents provider transmits educational videos, it is possible to be consecutively reproduced every 20 minutes in the client.

For example, in case of reproducing the educational contents such as the lecture, learners, i.e., users, want that three lessons are progressed every 20 minutes. In other words, the learners want to take a break for 10 minutes after taking a first lesson for 20 minutes, and then take another lesson for 20 minutes. In order to do so, a learner should click the play and pause buttons one by one. But, it may not be intentionally progressed. In addition, if several learners take the lessons simultaneously, the lessons may not be progressed as smooth as real lessons.

In this case, a contents reproducer according to the present invention is very useful. In other words, if the learners can be provided with a contents reproducer 150 in which a new command (e.g., a button type manipulation unit) into which the characteristics of the contents are reflected is generated by the user or by the contents provider thus to execute the operation, the learners may take the lecture more conveniently.

Thus, the user can easily reproduce the educational contents by only executing a new command corresponding to each characteristic of the contents. For example, if the user executes only the new command, the contents for total 60 minutes may be reproduced in sequence of play for 20 minutes, pause for 10 minutes and then play for 20 minutes.

Further, if the contents provider provides with the user an easy environment for modifying a design and an operation of the contents reproducer 150, it is very helpful with the user to define the design and operation of the contents reproducer 150 by him/herself. It will be explained in detail with reference to FIG. 5.

As shown in FIG. 2, the customizing unit 151 includes a design definition unit 152, an operation definition unit 153 and a mapping unit 154.

The design definition unit 152 allows the user to define or generate the external appearance (i.e., background image) and an object (ex., button) to be displayed on the external appearance.

The design definition unit 152 may be implemented as a program module comprising the contents reproducer 150. Also, the design definition unit 152 may be implemented as an API (Application Programming Interface) for defining or generating the object desired by the user. The newly defined or generated object may be represented in a markup language or as a markup language file. The markup language may be an XML (eXtensible Markup Language) that is applicable to an application such as the contents reproducer 150.

In case that the XML (eXtensible Markup Language) is used, since the XML can independently exist due to the characteristics of itself, regardless of types of platforms such as types of programs (applications), types of operating systems, the contents provider and the user of the client may facilitate the modification.

Accordingly, the contents provider or the user can design the object, e.g., the button type object, as he/she desires using the markup language. The design means a form of the object, including a position, a size, a shape, a color and a combination thereof.

The operation definition unit 153 allows the user to define or generate a new command (or new operation) desired by the user. The newly defined or generated command may be represented in a markup language or as a markup language file. The operation definition unit 153 may be implemented as the API (Application Programming Interface)

The operation definition unit 153 may exist as a module separated from the design definition unit 152 or may be defined in the design definition unit 152. It is obvious to those skilled in the art related to the field of the present invention that the design definition unit 152 and the operation definition unit 153 are merely logically distinguished from each other.

Thus, the contents provider or the user can define the new operation or new command so that the contents reproducing unit 158 is controlled as desired by him/herself. Here, the user may be provided with a list on prepared operations made out in the markup language so as to define the new operation or the new operation using the markup language.

The new operation or the new command may exist as a code in the contents reproducing unit 158. And, when the list on the operations is provided, a corresponding function may be pointed out in the markup language based on the list.

Defining the design and operation using the markup language such as the XML is merely one embodiment of the present invention. It may be provided with a design and operation definition tool provided with a GUI (Graphic User Interface) for defining the design and operation.

In this case, the operation and the design to be generated can be defined even when the user doesn't know a grammar of the XML. This may be particularly useful for a case for allowing the user to define the design and operation of the object of the contents reproducer 150 by him/herself. It will be explained in detail with reference to FIG. 5.

The mapping unit 154 serves to map the new operation or command with the object which is defined by the user to be displayed. That is, when the user defines a star-shaped object, the operation or command to be executed is mapped with the star-shaped object by click. For example, the operation may be implemented in sequence of play (20 minutes), pause (10 minutes), play (20 minutes) and then pause (10 minutes).

In this case, a unique ID is given to each of the object and the operation (or command) so that the object and the operation may be mapped and managed based on the ID. In case that there are a plurality of the objects or the operations, each of the objects and the operations can be managed using the unique ID. The unique ID is allocated by the mapping unit 154. Alternatively the unique ID may be allocated by the design definition unit 152 or the operation definition unit 153. Thus, by using these matches, it is possible to execute plural operations using one object, and to execute one operation using multiple objects.

In order to manage the operation, the mapping unit 154 may additionally have a FP (Function Pointer) pointing out a specific function among several functions consisted in the operation, in addition to the unique ID. Alternatively, in order to manage the operation, the contents reproducing unit 158 or the contents reproducer 150 have the FP.

The FP serves to point out a position of the specific function. The FP calls out a specific function among the several functions prepared within the contents reproducing unit 158 so as to execute the function in the contents reproducing unit 158.

Accordingly, when the user clicks the object, functions to be executed are called out and executed using the FP to execute the operation mapped to the object.

As aforementioned, in case that there are multiple operations, the FP corresponding thereto may be plural. Also, it is capable of calling out multiple functions and executing them at the same time or at different times.

Figure 3:
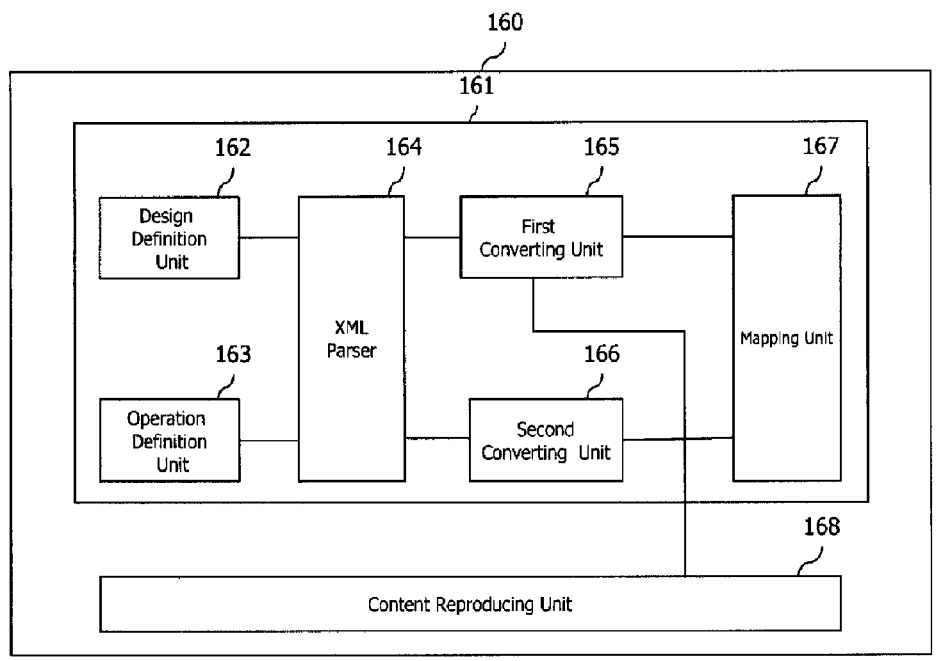
FIG. 3 is a diagram illustrating a logical configuration of a contents reproducer in accordance with another embodiment of the present invention.

FIG. 3 is a diagram illustrating a configuration of a contents reproducer in accordance with another embodiment of the present invention.

Referring to FIG. 3, a contents reproducer 160 includes a customizing unit 161 and a contents reproducing unit 168. Here, the contents reproducing unit 168 may be implemented as a module separated from the customizing unit 161 or as one module together with the customizing unit 161.

The customizing unit 161 includes a design definition unit 162, an operation definition unit 163, an XML parser 164, a first conversion unit 165, a second conversion unit 166 and a mapping unit 167.

The design definition unit 162 allows the user to defines a position, a size, a form, a shape, a color of an object to be displayed or an appearance of the contents reproducer 160 and a combination thereof. The design definition unit 162 may be implemented as an XML file or as an interface for generating the XML file.

The operation definition unit 163 allows the user to define a new command for controlling the contents reproducing unit 168 or new operation. The operation definition unit 162 may be implemented as an XML file or as an interface for generating the XML file.

The XML parser 164 serves to check a grammar of the XML file so as for the generated XML file to be recognized in the contents reproducing unit 168 and to generate an element tree structure by splitting the XML file. If there is an error in the grammar, the error is informed to a user.

The XML parser 164 generally has a library type and is mainly made out in a language such as a C++, a java. The XML parser may independently exist or be included in the contents reproducing unit 168.

The new object and the new operation (or new command) defined in the XML by the design definition unit 162 and the operation definition unit 163 are analyzed by the XML parser 164, and then the first conversion unit 165 and the second conversion 166 unit generate a converted object and a converted operation that can be used in the contents reproducing unit 168, using the analysis result. The first conversion unit 165 and the second conversion unit 166 may be implemented as an XML processor.

The converted object may be implemented as a button, an image, a slider bar on the contents reproducing unit 168, and the converted operation may be implemented as a FP (Function Pointer) pointing out a function within the contents reproducing unit 168. The converted operation means the FP executing the operation defined in the operation definition unit 163. Accordingly, the converted operation means a function to be executed for the operation in the contents reproducing unit 168, not directly meaning a specific operation or object.

The mapping unit 167 manages the converted object and the converted operation. For example, in case that a star-shaped button is defined in an XML through the design definition unit 162, when the XML is analyzed by the XML parser, the star-shaped button that can be displayed on the contents reproducing unit 168 is generated. And then, a unique ID can be given to the star-shaped button. It is obvious that the button has a size, a shape, a color and a position as designated in the XML as characteristics.

Also, when the star-shaped button is defined in an XML file using the operation definition unit 163, it is analyzed by the XML parser and then a FP that can call out a function within the contents reproducing unit 168 is generated thus to give the unique ID to the button. For example, a FP sequentially pointing out a play function, a pause function, the play function, and the pause function can be generated.

The mapping unit 167 maps the converted object with the converted operation. The mapping can be achieved by using the given unique ID. In case that multiple operations are required to be executed according to one converted object, several converted operations per one converted object can be mapped and managed. And, several converted objects are mapped with one converted operation, accordingly the same converted operation can be executed whichever one of the converted operations is clicked.

Also, in case that a plurality of converted objects are generated, a list may be configured to distinguish one converted object from the plurality of converted objects using the unique ID and held by the mapping unit 167.

When executing the contents reproducing unit 168, the converted object is displayed on the external appearance of the contents reproducing unit 168 according to the definition by the design definition unit 162. For example, in case that the contents reproducing unit 168 is implemented as a movie player, a star-shaped manipulation button may be formed in a manipulation unit of the movie player.

The user may access a server providing one or more educational contents and then request corresponding content. If the user selects the star-shaped button displayed on the contents reproducer 160 to reproduce the content, then corresponding function stored in the mapping unit 167 is called out using the FP.

In this case, the contents reproducer 160 reproduces the contents for 20 minutes and remains the pause state for 10 minutes. Accordingly, the user can review the lesson or carry out a private business. And, when 10 minutes elapses, the contents reproducer 160 reproduces the contents again thus to take the lecture.

In the related art, it is capable of adjusting only a design of the external appearance of the contents reproducer 150 or 160. However, according to the present invention, it is capable of newly defining operations (or commands) of the contents reproducer 160 as well as designing the external appearance as desired. Also, by mapping an object displayed on the external appearance with the operation, it is capable of controlling the contents reproducer 160 so that desired operations can be executed when the object is selected. Accordingly, the contents provider can provide the contents reproducer 160 that can allow to the user to efficiently reproduce and control the contents according to the characteristics of the content. That is, if the contents reproducer according to the present invention is provided to the user, the user can reproduce and control the contents such as movies, lectures in a customized manner.

For example, when using a VoD service, if the user wants to reproduce the movie to allow an explanatory title to be displayed on a screen for 10 minutes and then to allow the explanatory title not to be displayed for next 10 minutes, the user can define to use the object and the operation by him/herself.

Figure 4:
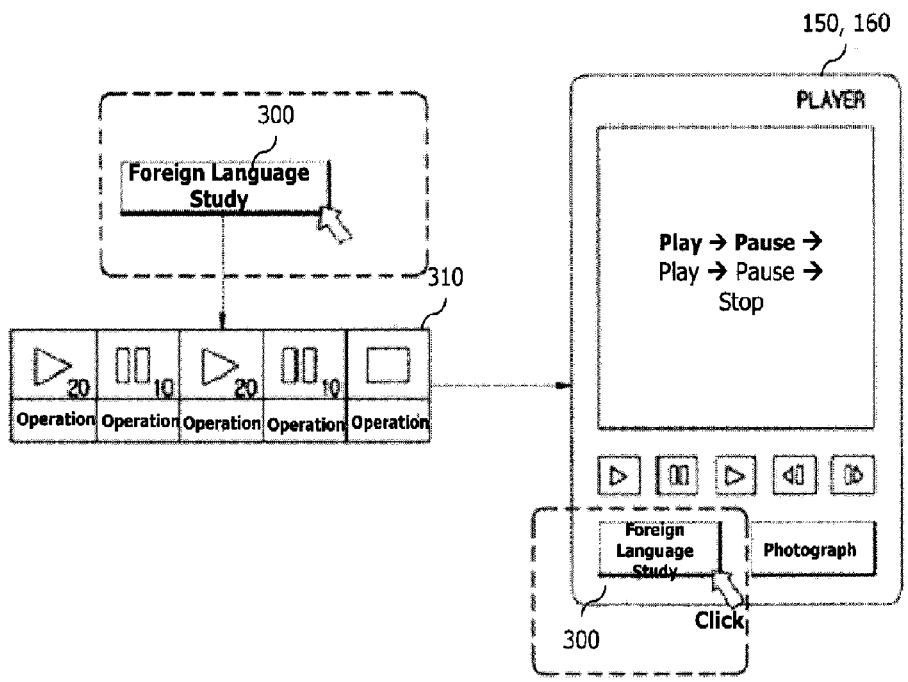
FIG. 4 is a view illustrating a process for controlling the contents reproducer shown in FIG. 2 or FIG. 3.

FIG. 4 is a view illustrating a process for controlling the contents reproducer shown in FIG. 2 or FIG. 3.

Referring to FIG. 4, a new object 300 into which a text, "foreign language study", is inserted is displayed on a screen of the contents reproducer 150 or 160. For convenient explanation, the object 300 displayed on an external appearance of the contents reproducer 150 or 160 is enlarged and then illustrated at a left side of FIG. 4.

As shown in FIGS. 2 and 3, the new object 300, the "foreign language study", is defined in the XML, i.e., the markup language, and then analyzed by the XML parser to be recognized by a program, thereby representing a button type, the "foreign language study". Here, a design XML file may be the design definition unit 152 or 162 described in FIGS. 2 and 3.

Accordingly, the XML file is composed such that the new object configured with pre-desired form and text can be displayed at a desired position in a desired size.

A new operation defined to execute multiple operations 310 is mapped to the object 300, i.e., "foreign language study". That is, the new operation is mapped to a series of operations 310 sequentially executing play, pause, play, pause and stop. Numerals displayed on a lower end of each operation indicate time for executing each operation shown in minutes. However, it is noted that the numerals are merely examples, the execution time and the representation manner are not limited thereto.

The new operation is defined as including the series of the operations 310 at the operation definition unit shown in FIGS. 2 and 3, and may be implemented as an operation XML file in FIG. 4.

Accordingly, in the operation XML file, the new operation related to the foreign language study can be defined, in addition to the general operations of play, stop, and pause. Also, the new object can be defined in a design XML file. However, the operation XML file and the design XML file should be mapped with each other through a unique ID. And, when the "foreign language study" represented on the contents reproducer 150 is clicked, the design XML file recognizes the clicking and then corresponding operation should be called out from the contents reproducing unit 158 of the contents reproducer 155 through the operating XML file.

On clicking the new object 310, i.e., the "foreign language study", the operations mapped to the new object 310 are sequentially executed. By transmitting both the movie player and the definition files to the user, the series of operations 310 including play of a lesson for 20 minutes, pause for 10 minutes, . . . , stop are automatically executed when the user, who wants to reproduce the educational video provided by the contents provider, clicks the object 300, i.e., the foreign language study.

Figure 5:
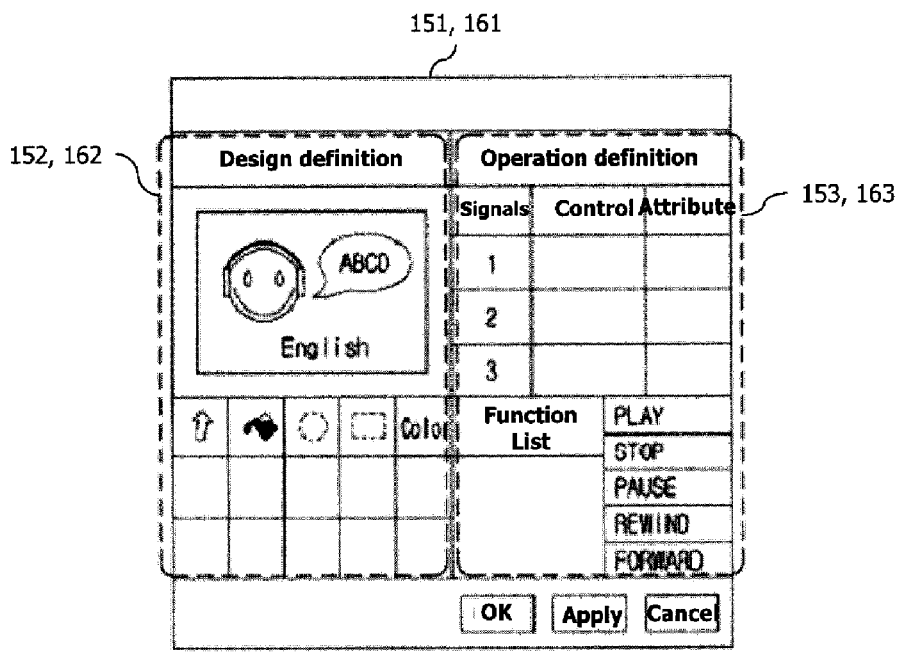
FIG. 5 is a view illustrating a screen on which operation of a contents reproducer is generated in accordance with another embodiment of the present invention.

FIG. 5 is a view illustrating a screen on which a operation of a contents reproducer is generated in accordance with another embodiment of the present invention.

Referring to FIG. 5, a screen by the customizing unit 151 or 161 is illustrated.

The screen by the customizing unit 151 or 161 serves to define the new object and the new operation to be executed by clicking the object, using a GUI (Graphic User Interface) without use of the XML. Particularly, it is useful for a case that the user is allowed to define the design of the new object and the new operation by him/herself.

A screen by the design definition unit 152 or 162 by which the object can be directly designed is shown at a left side of the screen by the customizing unit 151 or 161. In the design definition unit 152 or 162, the user can design an image by him/herself and insert a text thereinto.

A screen by the operation definition unit 153 or 163 is shown at a right side of the screen by the customizing unit 151 or 161. That is, it is configured to define the operation mapped with the defined object. That is, on previously providing the operations applicable to the contents reproducer (not shown), the user can select an operation and register an operation time, characteristics of the operation, etc.

That is, when selecting a time of 20 minutes after selecting the operation of 'play', and then selecting a speed of 2 times, a new operation for reproducing one or more contents for 20 minutes in a speed of 2 times is defined. Thereafter, on pressing a 'Apply' button, corresponding object and the operation are mapped to each other and then registered to a mapping unit.

Accordingly, when the contents reproducer (not shown) is executed by the user, the newly defined object may be displayed on the contents reproducer. A size and a position of the new object are displayed as they are defined. Accordingly, an XML file that the design and the operation defined by the tool, i.e., the GUI, are defined in the XML is generated, and then analyzed by the XML parser so as to be displayed on the contents reproducer, through the XML processor using the analysis result.

Thus, on clicking the new object, a corresponding operation is executed as described in FIG. 3. The corresponding operation can be stored as the FP. Accordingly, it is capable of directly calling out a function through the FP so as to be executed.

Accordingly, the FP calls out the function executed in the contents reproducer so as to allow the operation to be executed in the contents reproducer. And, the plurality of functions are called out so as to execute the operation, which will be omitted because it is same as the described in FIG. 3.

Figure 6:
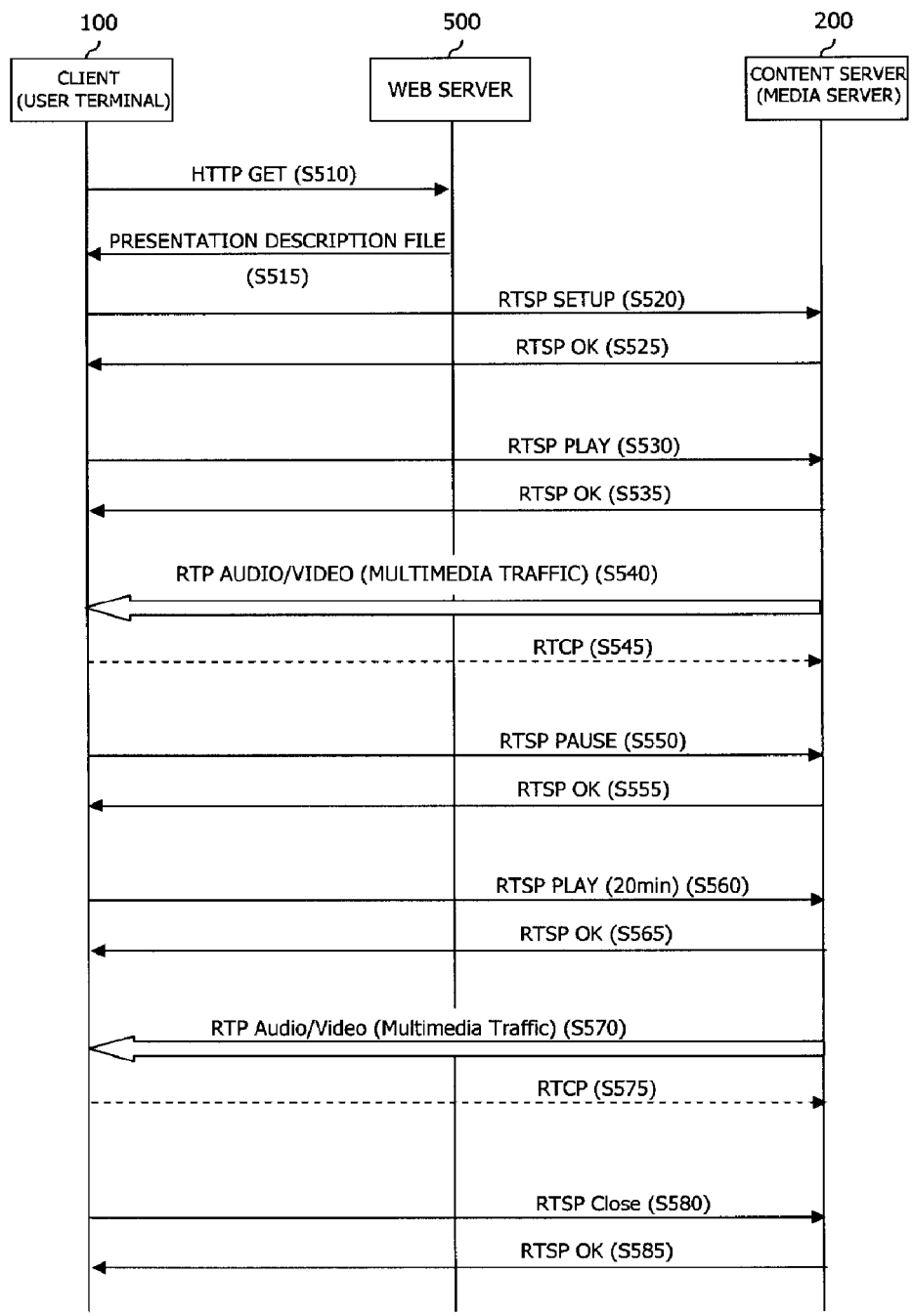
FIG. 6 is a view illustrating a case that contents reproducer is applied to a VoD (Video on Demand) in accordance with the present invention.

FIG. 6 is a view illustrating a case that a contents reproducer is applied to a VoD service in accordance with the present invention.

First, a client 100 transmits a HTTP request to a web server 500 of a contents provider (S510) thus to receive a presentation description file (S515). The web server 500 can transmit the contents reproducer together with the presentation description file. The contents reproducer such as the movie player is installed at a user terminal. In this specification, the 'user terminal' and the 'client' have the same meaning.

And, the web server 500 previously generates the design XML file and the operation XML file described in FIG. 3 and transmits the XML files to the client 100. And, the contents reproducer as shown in FIGS. 2 and 3 may be executed in the client 100 using the files. The user also can modify the design XML file and the operation XML file so as to operate an additional operation, which is same as the description of FIGS. 2 and 3.

A browser of the client 100 receives a HTTP response message and executes the contents reproducer corresponding to a video type field of the message.

The presentation description file includes an address for digital media contents (audio/video) (refer to a movie or moving picture), the address using 'rstp://~~' according to a URL (Uniform Resource Locator) technique. Accordingly, the client sends a transmission request to the contents server 200 having digital media contents, for example, a media server.

Hereafter, it will be described with focusing on a request of the digital media contents to the contents server 200. However, this may be a surrogate server for a CDN (Contents Delivery Network), a proxy server, the web server 500 and an origin server, and the kind of the server of the present invention is not limited thereto.

The Contents Delivery Network (CDN) is generally used to solve a problem such as an error due to an overload or decrease in a transmission speed, generally caused by transmission of one or more contents to the client 100 in a server operated by the contents provider by him/herself.

That is, used is a network control device so as to transmit the contents by a specific server corresponding to an optimal transmission server determined based on status information of a network among several servers. The status of the network can be periodically monitored.

In this case, it is obvious that the several servers used to transmit the contents instead of the server directly operated by the contents provider are surrogate servers and the proxy server also can serve this function. Thus, the contents server 200 shown in FIG. 6 may be implemented as the surrogate server, the proxy server, etc.

In detail on the request, the client 100 sends a RTSP (Real Time Streaming Protocol) SETUP request message to the contents server 200 (S520). The RTSP is a protocol used for a streaming service.

The SETUP request message includes a RTSP address that is an address of the digital media contents, a RTSP version, a port number of a client to which the digital media contents (audio/video data) (i.e., movie or moving picture) is to be transmitted, codec information, etc. Here, the contents server 200 responds to the message by sending a RTSP OK message, accordingly a session is initiated (S525).

For example, in case of requesting an educational contents from the web server 500, the educational contents can be transmitted by accessing the contents server 200 in which the educational contents is located thus to be reproduced. In this case, as described by FIGS. 2 to 5, it is requested through the RTSP to execute a new operation by clicking the object previously defined through the design definition unit 152 or 162 and the operation definition unit 153 or 163.

That is, when desired to execute the operations including play of a first lesson of the educational contents for 20 minutes, pause for 10 minutes, . . . , stop, a RTSP PLAY request is transmitted by clicking the pre-defined object once (S530). The contents server 200 transmits a RTSP OK signal (S535), accordingly the session is established and then a RTP (Real Time Protocol) audio/video data corresponding to the educational contents is transmitted (S540), thereby being capable of reproducing the educational contents for 20 minutes at the user terminal. Here, information on the session can be periodically transmitted between the client 100 and the contents server 200 through a RTCP (Real Time Control Protocol) (S545).

On completing the first lesson of the educational contents for 20 minutes, the user terminal transmits a RTSP PAUSE request to the media server so as to execute the pause operation, the next operation, according to the operations mapped to the object (S550). Then, the media server transmits the RTSP OK signal (S555) and then stops transmitting the RTP audio/video data so as to accomplish a pause operation of the movie player.

After maintaining the pause state for 10 minutes, the RTSP PLAY request is transmitted again from the client 100 to the contents server 200, so as to reproduce a next lesson (S560). Then the contents server 200 transmits the RTSP OK signal to the user terminal (S565), thus to transmit the RTP audio/video data of the next educational contents (S570). Here, same as the aforementioned, information on the session can be periodically transmitted between the client 100 and the contents server 200 through the RTCP (Real Time Control Protocol) (S575).

The operations are repeated by pre-set times. For example, when each lesson of the educational contents for 20 minutes is sequentially reproduced and finally the final lesson for 20 minutes is finished, a RTSP CLOSE (STOP) request is transmitted (S580). Then, the contents server 200 sends the RTSP OK signal (S585), accordingly the educational contents at the user terminal is completed.

Accordingly, the present invention can be used for a real-time transmission for a VoD. And, according to the present invention, the web server 500 or the contents server 200 transmits the contents to the user terminal by defining the object and the operation according to the characteristics of the user terminal, so as for the user to use the content.

Figure 7:
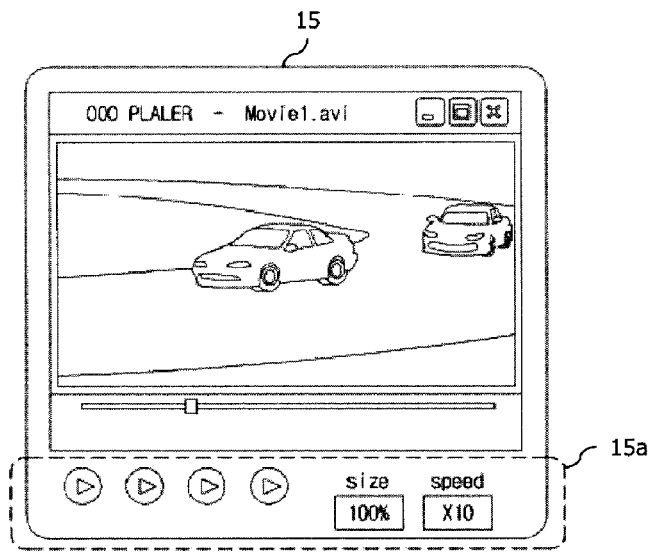
FIG. 7 is an exemplary view comparing contents reproducer in the related art with contents reproducer in accordance with the present invention.
Figure 7:
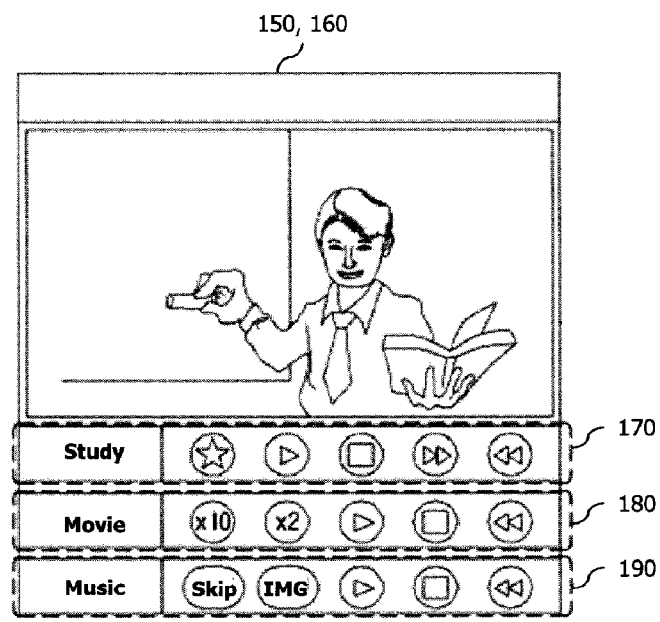

FIG. 7 is an exemplary view comparing contents reproducer in the related art with contents reproducer in accordance with the present invention.

FIG. 7(*a*) illustrates that a moving picture file is reproduced by contents reproducer 15 in the related art.

The contents reproducer 15 in FIG. 7(*a*) is provided with a control part 15*a* on an external appearance thereof. That is, by the control part 15*a*, it is capable of controlling play, stop, forward, rewind, a size and a reproduction speed. However, with these operations, it is not capable of defining and using a customized operation, that is a particular operation, e.g., play for 20 minutes, pause for 10 minutes and then play for 20 minutes.

However, as shown in FIG. 7(*b*), the contents reproducer 150 or 160 in accordance with the present invention allows the user to selectively define and use a desiring operation.

For example, when reproducing one or more educational contents using the contents reproducer 150 or 160, a control part 170 including the object pre-defined by the user is displayed on the external appearance thereof. When providing various contents including the educational content, a plurality of control part 180, 190 comprising objects newly customized to execute operations corresponding to each contents may be provided.

In FIG. 7(*b*), a button displayed by a star shape corresponds to one object. For example, the star-shaped button can be defined as the object in the XML. And, this can be displayed on the contents reproducer 150 or 160 through the aforementioned XML parser and the XML processor.

Also, an ID is given to the defined star-shaped button so as to be identified and the operation corresponding to the ID is defined in the XML.

The operation defined in the XML has the FP (Function Pointer), which serves to call out a function executed at the contents reproducer 150 or 160.

The function pointer means the defined operation. Thus, the function pointer can be managed as a collection of the object, the operation and the function pointer using the aforementioned ID. And, the management is executed by the additional mapping unit, as described above.

Thus, when the user of the contents reproducer 150 or 160 in FIG. 7(b) reproduces the educational contents and clicks the star-shaped button, the mapping unit 154 or 167 recognizes it and allows to the operation managed by using the ID of the object to be executed. The operation is immediately executed by calling out a function of the contents reproducer 150 or 160 using the connected FP.

Thus, the operations including play of a first lesson for 20 minutes, pause for 10 minutes and then play of a next lesson for 20 minutes are executed, accordingly the user can efficiently take the online lecture by clicking once the object generated by him/herself when reproducing the content, without an additional manipulation every lesson of 20 minutes.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

And, as aforementioned, the method of the present invention may be implemented as a program and stored in a computer-readable recording medium (e.g., CD-ROMs, RAMs, ROMs, floppy disks, hard disks, optical disks, etc.).

Figure 8:
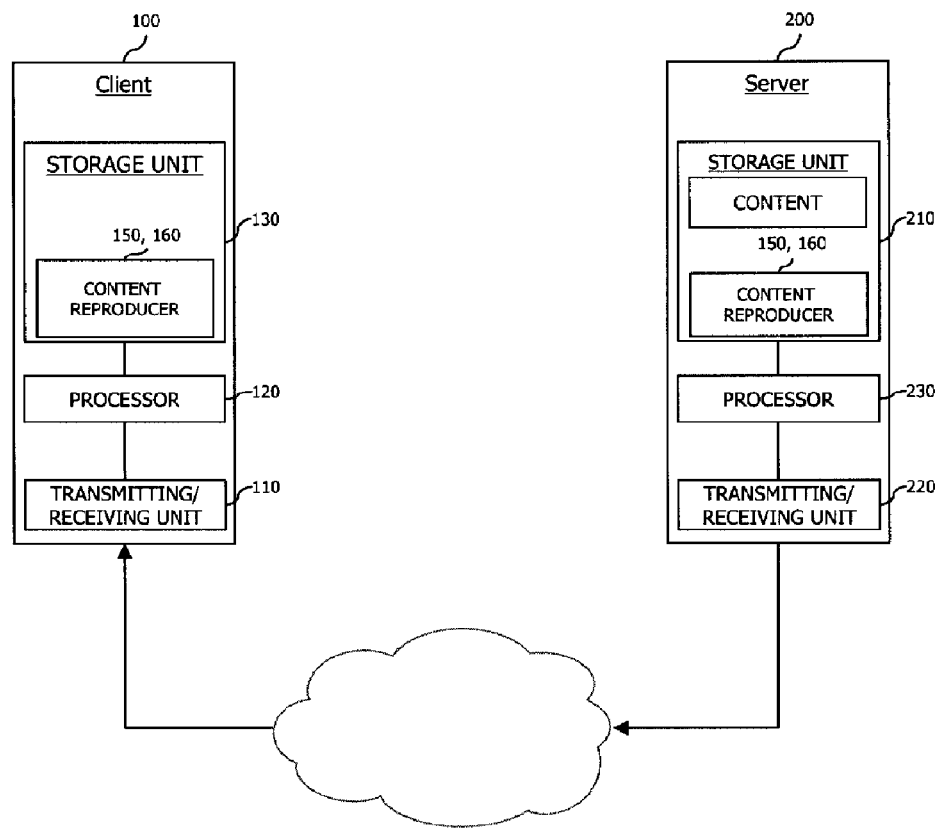
FIG. 8 shows a block diagram illustrating a configuration of the client and the server in accordance with the present invention.

FIG. 8 shows a block diagram illustrating a configuration of the client 100 and the server 200 in accordance with the present invention.

The server 200 receives a request for specific contents from the client, and then checks whether the contents reproducer 150 or 160 is installed in the client 100, and transmits the contents reproducer 150 or 160 to the client, if it is determined that the contents reproducer 150 or 160 is not yet installed. Then, the server 200 transmits the requested content.

Such the server 200 includes a storage unit 210, a transmitting/receiving unit 220 and a processor 230.

The storage unit 210 stores a plurality of contents and the contents reproducer 150 or 160.

The transmitting/receiving unit 220 receives a request of one or more specific contents among the plurality of contents stored the storage unit 210 from the client 100, and transmits the contents reproducer 150 or 160 and then transmits the requested contents to the client 100.

The processor 230 checks whether the contents reproducer 150 or 160 is installed in the client 100 in response to the request and controls the transmitting/receiving unit 220 to transmit the contents reproducer 150 or 160 stored in the storage unit 210 to the client 100 if it is determined that it is not yet installed. Also, the processor 230 controls the transmitting/receiving unit 220 to transmit the requested contents stored in the storage unit 210 to the client 100.

Meanwhile, the terminal 100 requests one or more specific contents from the server 200, receives the contents reproducer 150 or 160 and installs it. Then, the terminal 100 receives the requested contents and reproduces the received contents using the contents reproducer 150 or 160.

As shown, the terminal 100 includes a transmitting/receiving unit 110, a controller 120 and a storage unit 130.

The transmitting/receiving unit 110 transmits the request of the specific content, receives the contents reproducer 150 or 160 and receives the requested content.

The controller 120 installs the contents reproducer 150 or 160 into the storage unit 130, executes it to reproduce the received content.

The storage unit 130 stores the contents reproducer 150 or 160.

The invention claimed is:

1. A computer-implemented method for providing media content to a client device, the method comprising:
  receiving, from the client device, a request for media content;
  receiving, from a contents reproducer on the client device, a command that is associated with a sequence of a plurality of operations that control reproduction of the media content on the client device, wherein the sequence of the plurality of operations are defined by a user using the contents reproducer on the client device; and
  transmitting, to the contents reproducer on the client device, the requested media content according to the sequence of the plurality of operations associated with the received command that control reproduction of the media content on the contents reproducer;
  wherein the sequence of the plurality of operations comprises at least two of the following playback commands in an order specified by the user: a play command, a pause command, a stop command, a rewind command, or a forward command; and
  wherein each of the plurality of operations is performed for a time period defined by the user.

2. The method of claim 1, wherein the media content comprises at least one of an image, a video, a sound, a text, and a game.

3. The method of claim 1, wherein the contents reproducer includes at least one of:
  a first unit which allows the user to define the command to include the sequence of the plurality of operations;
  a second unit which allows the user to define an external appearance of a user interface element associated with the command, the user interface element displayed on the contents reproducer.

4. The method of claim 3, wherein the contents reproducer further includes:
  a mapping unit which maps the user interface element with the command.

5. The method of claim 3, wherein the contents reproducer further includes at least one of:
  a first converting unit for converting the user interface element into an object readable by the contents reproducer; and
  a second converting unit which converts the command into another command readable by the contents reproducer.

6. The method of claim 1, wherein the contents reproducer comprises:
  a contents reproducing unit for reproducing the media content; and
  a customizing unit for allowing the user of the client device to define the command and an external appearance of a user interface element associated with the command.

7. The method of claim 6, further comprising:
  transmitting, to the client device, the contents reproducing unit including the customizing unit.

8. The method of claim 1, further comprising:
  checking whether the contents reproducer is installed in the client device; and
  transmitting, to the client device, the contents reproducer responsive to the contents reproducer not being installed on the client device.

9. The computer-implemented method of claim 1, wherein transmitting, to the contents reproducer on the client device, the requested media content comprises:
- transmitting a first portion of the media content to the contents reproducer for a first time period based on the plurality of operations;
- halting transmission of the media content to the contents reproducer for a second time period based on the plurality of operations; and
- transmitting a second portion of the media content to the contents reproducer for a third time period based on the plurality of operations.

10. A server computer for providing media content to a client device, comprising:
- a computer processor; and
- a computer-readable storage medium storing executable code, the code when executed by the computer processor performs steps comprising:
  - receiving, from the client device, a request for media content
  - receiving, from a contents reproducer on the client device, a command that is associated with a sequence of a plurality of operations that control reproduction of the media content on the client device, wherein the sequence of the plurality of operations are defined by a user using the contents reproducer on the client device; and
  - transmitting to the contents reproducer on the client device the requested media content according to the sequence of the plurality of operations associated with the received command that control reproduction of the media content on the contents reproducer;
  - wherein the sequence of the plurality of operations comprises at least two of the following playback commands in an order specified by the user: a play command, a pause command, a stop command, a rewind command, or a forward command; and
  - wherein each of the plurality of operations is performed for a time period defined by the user.

11. The server computer of claim 10, wherein the contents reproducer includes at least one of:
- a first tool, which allows the user to define the command to include the sequence of the plurality of operations; and
- a second tool, which allows the user to define an external appearance of a user interface element associated with the command, the user interface element displayed on the contents reproducer.

12. The server computer of claim 10, further comprising:
- a first storage unit for storing the media content; and
- a second storage unit for storing the contents reproducer for transmission to client devices.

13. The server computer of claim 12, wherein the second storage unit is located on a different server computer from the server computer.

14. A non-transitory computer-readable storage medium storing executable code for providing media content to a client device, the code when executed performs steps comprising:
- receiving, from the client device, a request for media content;
- receiving, from a contents reproducer on the client device, a command that is associated with a sequence of a plurality of operations that control reproduction of the media content on the client device, wherein the sequence of the plurality of operations are defined by a user using the contents reproducer on the client device;
- transmitting, to the contents reproducer on the client device, the requested media content according to the sequence of the plurality of operations associated with the received command that control reproduction of the media content on the contents reproducer;
- wherein the sequence of the plurality of operations comprises at least two of the following playback commands in an order specified by the user: a play command, a pause command, a stop command, a rewind command, or a forward command; and
- wherein each of the plurality of operations is performed for a time period defined by the user.

15. The non-transitory computer-readable storage medium of claim 14, wherein the media content comprises at least one of an image, a video, a sound, a text, and a game.

16. The non-transitory computer-readable storage medium of claim 14, wherein transmitting, to the contents reproducer on the client device, the requested media content comprises:
- transmitting a first portion of the media content to the contents reproducer for a first time period based on the plurality of operations;
- halting transmission of the media content to the contents reproducer for a second time period based on the plurality of operations; and
- transmitting a second portion of the media content to the contents reproducer for a third time period based on the plurality of operations.

17. A computer-implemented method for receiving media content from a server computer in a client device, the method comprising:
- transmitting a request for media content to the server computer;
- receiving from a user of a contents reproducer, a selection of a command that is associated with a sequence of a plurality of operations that control reproduction of the media content on the client device, wherein the sequence of the plurality of operations are defined by the user using the contents reproducer on the client device;
- transmitting the command to the server computer via the contents reproducer responsive to the selection;
- receiving the requested media content from the server according to the sequence of the plurality of operations associated with the received command; and
- reproducing the requested media content received from the server on the contents reproducer;
- wherein the sequence of the plurality of operations comprises at least two of the following playback commands in an order specified by the user: a play command, a pause command, a stop command, a rewind command, or a forward command; and
- wherein each of the plurality of operations is performed for a time period defined by the user.

18. The computer-implemented method of claim 17, further comprising:
- receiving, via the contents reproducer, a configuration of a user interface element that is associated with the command, the user interface element displayed on an external appearance of the contents reproducer;
- receiving, via the contents reproducer, a configuration of the command that specifies the plurality of operations; and
- mapping the command with the user interface element.

* * * * *